(12) United States Patent
Jyouzaki (10) Patent No.: US 11,919,587 B2
(45) Date of Patent: Mar. 5, 2024

(54) VEHICLE

(71) Applicant: KAWASAKI JUKOGYO KABUSHIKI KAISHA, Hyogo (JP)

(72) Inventor: Takahiro Jyouzaki, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 476 days.

(21) Appl. No.: 17/314,587

(22) Filed: May 7, 2021

(65) Prior Publication Data

US 2022/0355877 A1 Nov. 10, 2022

(51) Int. Cl.
| | |
|---|---|
| *B60K 5/04* | (2006.01) |
| *B60K 13/02* | (2006.01) |
| *B60K 13/04* | (2006.01) |
| *B60K 17/00* | (2006.01) |
| *B60N 2/005* | (2006.01) |
| *B62D 33/02* | (2006.01) |
| *B62D 63/04* | (2006.01) |
| *F01N 1/00* | (2006.01) |
| *F02M 35/02* | (2006.01) |
| *F02M 35/10* | (2006.01) |
| *F16H 37/02* | (2006.01) |

(52) U.S. Cl.
CPC ............... *B62D 63/04* (2013.01); *B60K 5/04* (2013.01); *B60K 13/02* (2013.01); *B60K 13/04* (2013.01); *B60K 17/00* (2013.01); *B60N 2/005* (2013.01); *B62D 33/02* (2013.01); *F01N 1/00* (2013.01); *F02M 35/02* (2013.01); *F02M 35/10144* (2013.01); *F16H 37/021* (2013.01)

(58) Field of Classification Search
CPC .......... B62D 63/04; B62D 33/02; B60K 5/04; B60K 13/02; B60K 13/04; B60K 17/00; B60N 2/005; F01N 1/00; F02M 35/02; F02M 35/10144; F16H 37/021
See application file for complete search history.

(56) References Cited

U.S. PATENT DOCUMENTS

| | | | | |
|---|---|---|---|---|
| 2007/0227793 | A1* | 10/2007 | Nozaki | F02M 35/02 180/68.3 |
| 2020/0122560 | A1 | 4/2020 | Ward et al. | |
| 2022/0355877 | A1* | 11/2022 | Jyouzaki | B60K 13/02 |
| 2022/0356939 | A1* | 11/2022 | Shimatani | F16H 57/0416 |

FOREIGN PATENT DOCUMENTS

CN 104564327 A * 4/2015 ............. B60K 13/02

* cited by examiner

*Primary Examiner* — Jacob B Meyer
(74) *Attorney, Agent, or Firm* — Wenderoth, Lind & Ponack, L.L.P.

(57) ABSTRACT

A vehicle including an engine body that has a crankcase that rotatably supports a crankshaft, a cylinder, and a cylinder head provided with an intake port and an exhaust port, in which a central axis of the crankshaft extends in the vehicle width direction, a CVT disposed on a side portion in the vehicle width direction of the engine body, a transmission disposed on one side in a front-rear direction of the engine body, an intake pipe connected to the intake port, an air cleaner connected to the intake pipe, an exhaust pipe connected to the exhaust port, and an exhaust muffler connected to the exhaust pipe. At least a part of each of the transmission, the intake pipe, the air cleaner, the exhaust pipe, and the exhaust muffler is disposed in a region where the engine body is projected in the front-rear direction.

20 Claims, 6 Drawing Sheets

VEHICLE

BACKGROUND OF THE INVENTION

Technical Field

The present invention relates to a vehicle.

Related Art

US2020/0122560A1 discloses a vehicle for off-road recreation. The vehicle is provided with a cargo box behind a riding space. The vehicle is provided below the cargo box with a powertrain mechanism that includes an engine and a transmission.

SUMMARY

The powertrain mechanism further includes an air cleaner that filters the intake air taken into the engine. In the above vehicle, since the air cleaner is disposed directly above the engine, the powertrain mechanism is configured to be large in the vertical direction. Further, since the vehicle is intended for off-road use, the ground clearance of the powertrain mechanism is set to be high. Therefore, in the vehicle, the powertrain mechanism, which is configured to be large in the vertical direction, is mounted at a high position in the vertical direction to secure the ground clearance. For this reason, the cargo box located above the powertrain mechanism has a high ground clearance, and thus the usability of the cargo box deteriorates.

An object of the present invention is to provide a vehicle in which the powertrain mechanism is compactly configured in the vertical direction.

According to the present invention, there is provided a vehicle, including:
 an engine body that has a crankcase that rotatably supports a crankshaft, a cylinder, and a cylinder head provided with an intake port and an exhaust port in this order from the bottom, in which a central axis of the crankshaft extends in the vehicle width direction;
 a CVT disposed on a side portion in the vehicle width direction of the engine body, the CVT having a CVT input shaft connected to the crankshaft so as to be able to transmit power and a CVT output shaft that outputs drive rotation which is inputted to the CVT input shaft and then changed in rotation speed;
 a transmission disposed on one side in a front-rear direction of the engine body, the transmission having a transmission input shaft connected to the CVT output shaft so as to be able to transmit power and a transmission output shaft that outputs drive rotation which is inputted to the transmission input shaft and then changed in rotation speed;
 an intake pipe connected to the intake port of the cylinder head;
 an air cleaner directly or indirectly connected to an upstream side of the intake pipe;
 an exhaust pipe connected to the exhaust port of the cylinder head; and
 an exhaust muffler directly or indirectly connected to a downstream side of the exhaust pipe.

At least a part of each of the transmission, the intake pipe, the air cleaner, the exhaust pipe, and the exhaust muffler is disposed in a region where the engine body is projected in the front-rear direction.

According to the present invention, the powertrain mechanism of the vehicle including the engine body, an intake system, an exhaust system, the CVT, and the transmission is compactly disposed in the vehicle width direction and the vertical direction. In this manner, the vehicle can be compactly configured in the vehicle width direction and the vertical direction.

According to another aspect of the present invention, there is provided a vehicle including:
 an engine body which has a crankshaft extending in the vehicle width direction and a cylinder head;
 an intake pipe disposed on a front side of the engine body;
 an exhaust pipe disposed on a rear side of the engine body; and
 an air cleaner disposed on a front side of the engine body and directly or indirectly connected to an upstream side of the intake pipe.

An upper end of the air cleaner is located below an upper end of the cylinder head.

According to the present configuration, it is possible to suppress an increase in the dimension in the vertical direction of the powertrain mechanism, and it is easy to accommodate the powertrain mechanism in a limited space.

Further, according to still another aspect of the present invention, there is provided a vehicle including:
 an engine body which has a crankshaft extending in the vehicle width direction and a cylinder head;
 an intake pipe disposed on a front side of the engine body;
 an exhaust pipe disposed on a rear side of the engine body; and
 a power transmission unit that is disposed on an outer side in the vehicle width direction of the engine body and to which power is transmitted from the engine body.

The power transmission unit includes
 a driving force transmission unit that is disposed on one side in the vehicle width direction of the engine body and to which power is transmitted from the engine body as a driving force for traveling, and
 an auxiliary transmission unit that is disposed on the other side in the vehicle width direction of the engine body and to which is transmitted power from the engine body as a driving force for an auxiliary attached to the engine body,
 the cylinder head is provided with an exhaust port on a rear side,
 a cylinder head cover is fixed to an upper portion of the cylinder head,
 the exhaust pipe includes
 an upstream side exhaust pipe that curves toward the other side in the vehicle width direction as the upstream side exhaust pipe extends from the exhaust port to rear, and
 a downstream side exhaust pipe that is connected to a rear end portion of the upstream side exhaust pipe and extends to the one side in the vehicle width direction, and
 at least a part of the upstream side exhaust pipe passes through a region that is located on an outer side in the vehicle width direction than the cylinder head cover and on an inner side in the vehicle width direction than an outer end portion in the vehicle width direction of the auxiliary transmission unit.

According to the present invention, since the exhaust pipe extends outward in the vehicle width direction than the cylinder head cover, it is easy to lengthen the exhaust pipe. Further, since the exhaust pipe extends inward in the vehicle width direction than the outer end portion in the vehicle width direction of the auxiliary drive unit, it is easy to compactly configure the powertrain mechanism as a whole in the vehicle width direction. That is, deterioration in the mountability of the powertrain mechanism on the vehicle can be suppressed while the exhaust length is lengthened.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

A vehicle 100 according to an embodiment of the present invention will be described with reference to FIGS. 1 to 6. The vehicle 100 according to the present embodiment is a utility vehicle. In the description below, the front-rear direction, left-right direction, and vertical direction as seen from the driver will be referred to as the front-rear direction, left-right direction, and vertical direction of the vehicle 100 and each component.

Figure 1:
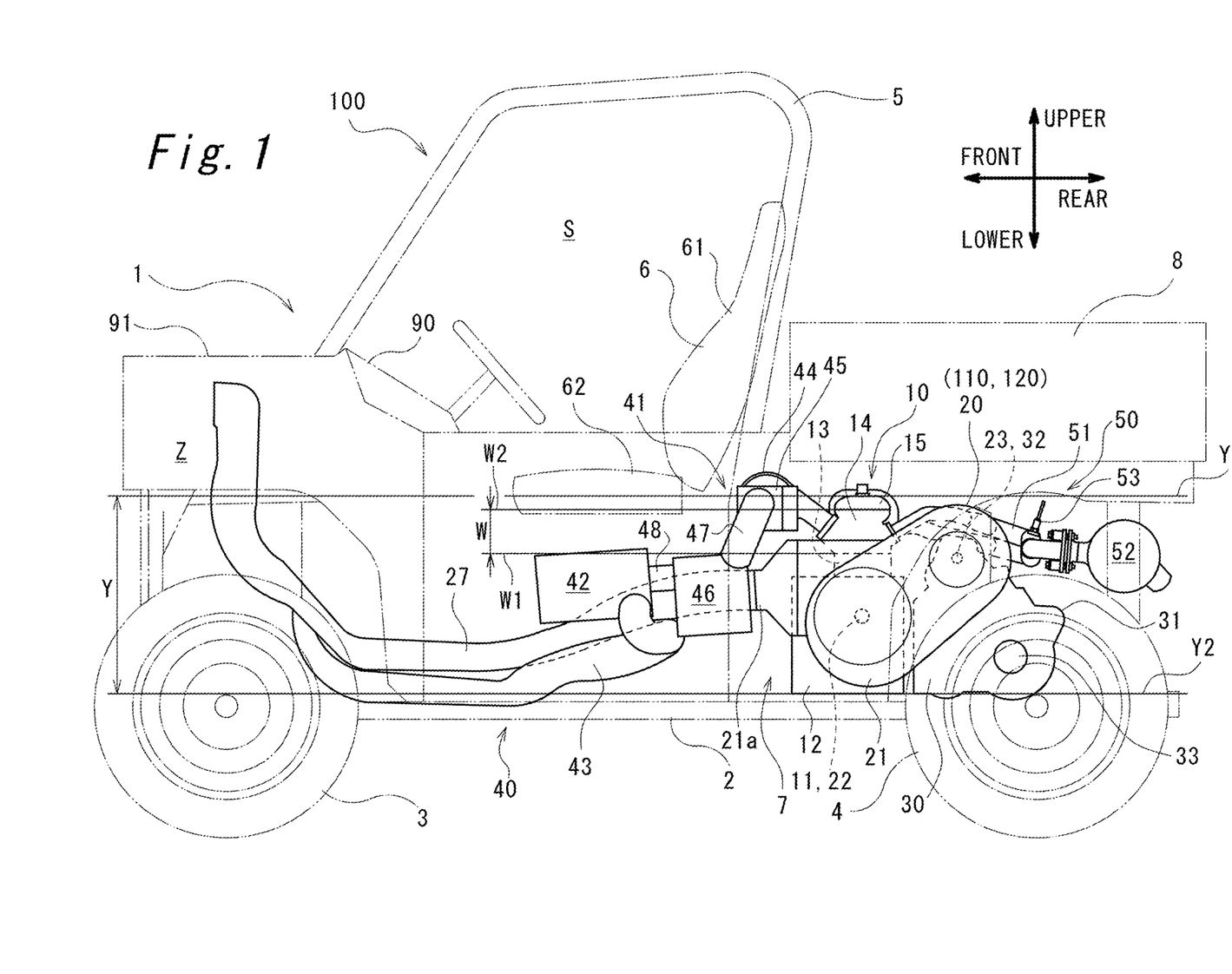
FIG. 1 is a left side view schematically illustrating a vehicle according to an embodiment of the present invention.

FIG. 1 is a left side view of the vehicle 100. As shown in FIG. 1, the vehicle 100 has a vehicle body 1 and a powertrain mechanism 7 mounted on the vehicle body 1. Note that, in FIG. 1, the vehicle body 1 is shown by a chain double-dashed line, and the powertrain mechanism 7 is shown by a solid line.

The vehicle body 1 includes a vehicle body frame 2 that constitutes a framework. In the vehicle body 1, a pair of left and right front wheels 3 are disposed on both sides of the front portion of the vehicle body frame 2, and a pair of left and right rear wheels 4 are disposed on both sides of the rear portion of the vehicle body frame 2. Riding space S is located between the front wheel 3 and the rear wheel 4. The riding space S is surrounded by a ROPS (Rollover Protective Structure) 5.

A seat 6 is disposed in the riding space S. The seat 6 includes a driver's seat 6A located on the left side of the riding space S and a passenger seat 6B located on the right side of the riding space S (see FIG. 2). The vehicle body 1 is provided with a cargo bed 8 behind the seat 6. Below the cargo bed 8, an engine body 10, a CVT (Continuously Variable Transmission) 20, and a transmission 30 that constitute the powertrain mechanism 7 are disposed. The vehicle 100 is configured such that the rotational torque output from the engine body 10 is changed in rotation speed by the CVT 20 and the transmission 30 and transmitted to the front wheels 3 and the rear wheels 4.

Figure 2:
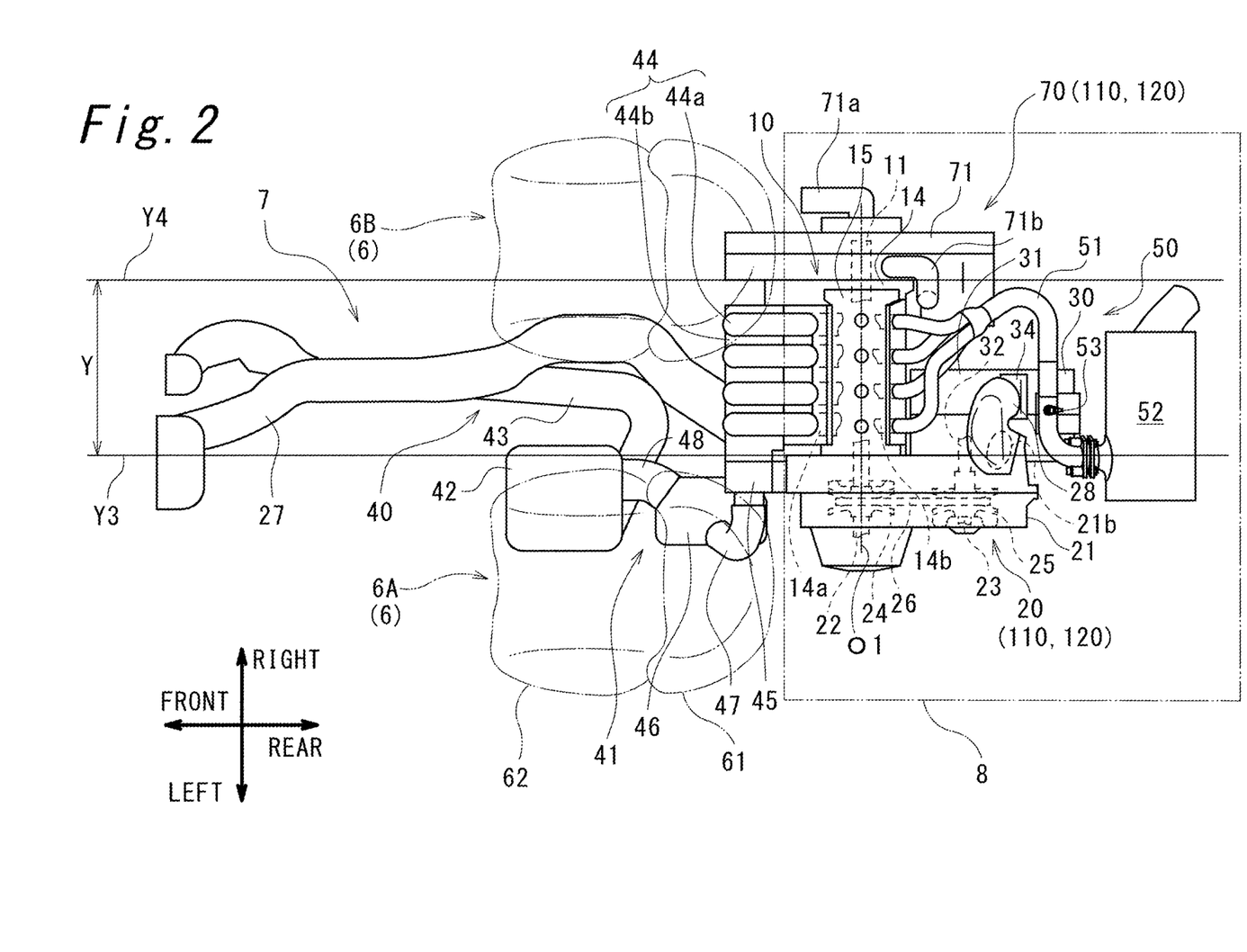
FIG. 2 is a top view schematically illustrating a powertrain mechanism.

Hereinafter, the powertrain mechanism 7 will be described. FIG. 2 is a top view of the powertrain mechanism 7. In FIG. 2, the seat 6 and the cargo bed 8 are both shown by a chain double-dashed line. With reference to FIG. 2 as well, the powertrain mechanism 7 further includes an intake system 40, an exhaust system 50, and an engine auxiliary unit 70 (see FIG. 6).

In the powertrain mechanisms 7, the CVT 20 and the engine auxiliary unit 70 constitute a power transmission unit 110 of the present invention in which the power is transmitted from the engine body 10. Further, the CVT 20 constitutes a driving force transmission unit 120 in which the power is transmitted from the engine body 10 as the driving force for traveling. Further, the engine auxiliary unit 70 constitutes an auxiliary transmission unit 130 in which the power from the engine body 10 is transmitted as a driving force for an engine auxiliary 71 attached to the engine body 10.

The engine body 10 has a crankshaft 11 as an output shaft from which rotational torque is output. In the present embodiment, the engine body 10 is a four-cycle in-line four cylinder engine in which a central axis O1 of the crankshaft 11 extends in the vehicle width direction. The engine body 10 has a crankcase 12, a cylinder 13, a cylinder head 14, and a cylinder head cover 15 in this order from the bottom.

The crankcase 12 rotatably supports the crankshaft 11. The cylinder 13 is coupled to the upper surface of the crankcase 12. The cylinder head 14 is coupled to the upper surface of the cylinder 13 and has four intake ports 14a on the front side and four exhaust ports 14b on the rear side. The cylinder head cover 15 is fixed to the upper surface of the cylinder head 14.

The CVT 20 (the power transmission unit 110 and the driving force transmission unit 120) is disposed adjacent to the left side of the engine body 10. The CVT 20 has a CVT housing 21 constituting an outer shell, and a CVT input shaft 22, a CVT output shaft 23, a drive pulley 24, a driven pulley 25, and an endless belt 26 accommodated inside the CVT housing 21.

The CVT input shaft 22 extends in the vehicle width direction and is connected to the crankshaft 11 so as to be able to transmit power. The CVT output shaft 23 extends in the vehicle width direction behind and above the CVT input shaft 22. The CVT 20 extends in a direction that is inclined upward toward the rear in a side view.

The drive pulley 24 is disposed on the CVT input shaft 22. The driven pulley 25 is disposed on the CVT output shaft 23. The endless belt (V belt) 26 is wound over between the drive pulley 24 and the driven pulley 25. In the CVT 20, the drive rotation inputted from the crankshaft 11 is transmitted to the CVT input shaft 22, has the speed changed through the drive pulley 24, the driven pulley 25, and the endless belt 26, and is output from the CVT output shaft 23.

The CVT housing 21 is provided with a CVT intake opening 21a in the front portion and a CVT exhaust opening 21b in the rear portion. The CVT intake opening 21a opens forward. The CVT exhaust opening 21b opens upward, more specifically, in a direction inclined forward and inward (right side) in the vehicle width direction toward the upper side. A CVT intake duct 27 is connected to the CVT intake opening 21a. A CVT exhaust duct 28 is connected to the CVT exhaust opening 21b, which protrudes toward the engine body 10 side (right side) in the vehicle width direction and exhausts rearward.

The CVT 20 takes in air from the CVT intake opening 21a into the inside of the CVT housing 21 through the CVT intake duct 27, and the inside of the CVT housing 21 is cooled by the taken-in air. Next, the air that has cooled the inside of the CVT housing 21 is discharged from the CVT exhaust opening 21b to the outside of the CVT housing 21 through the CVT exhaust duct 28. For example, the drive pulley 24 may be provided with a fin so that a centrifugal fan is constituted, and the fin may be configured to take in air from the CVT intake opening 21a as the drive pulley 24 rotates.

The CVT intake duct 27 extends forward below the substantially center in the vehicle width direction of the seat 6 to reach a bonnet space Z located in front of the riding space S. In the present description, as shown in FIG. 1, the bonnet space Z is defined in the front-rear direction as a range that is in front of a dashboard 90 that delimits a front end of the riding space S and has the front end extending to a front end portion of the vehicle body 1, and is defined in the vertical direction as a range in which the upper end is a bonnet 91 and the lower end is the vehicle body frame 2 and a wheel house (not shown). The CVT intake duct 27 extends upward in the bonnet space Z and opens forward.

Figure 6:
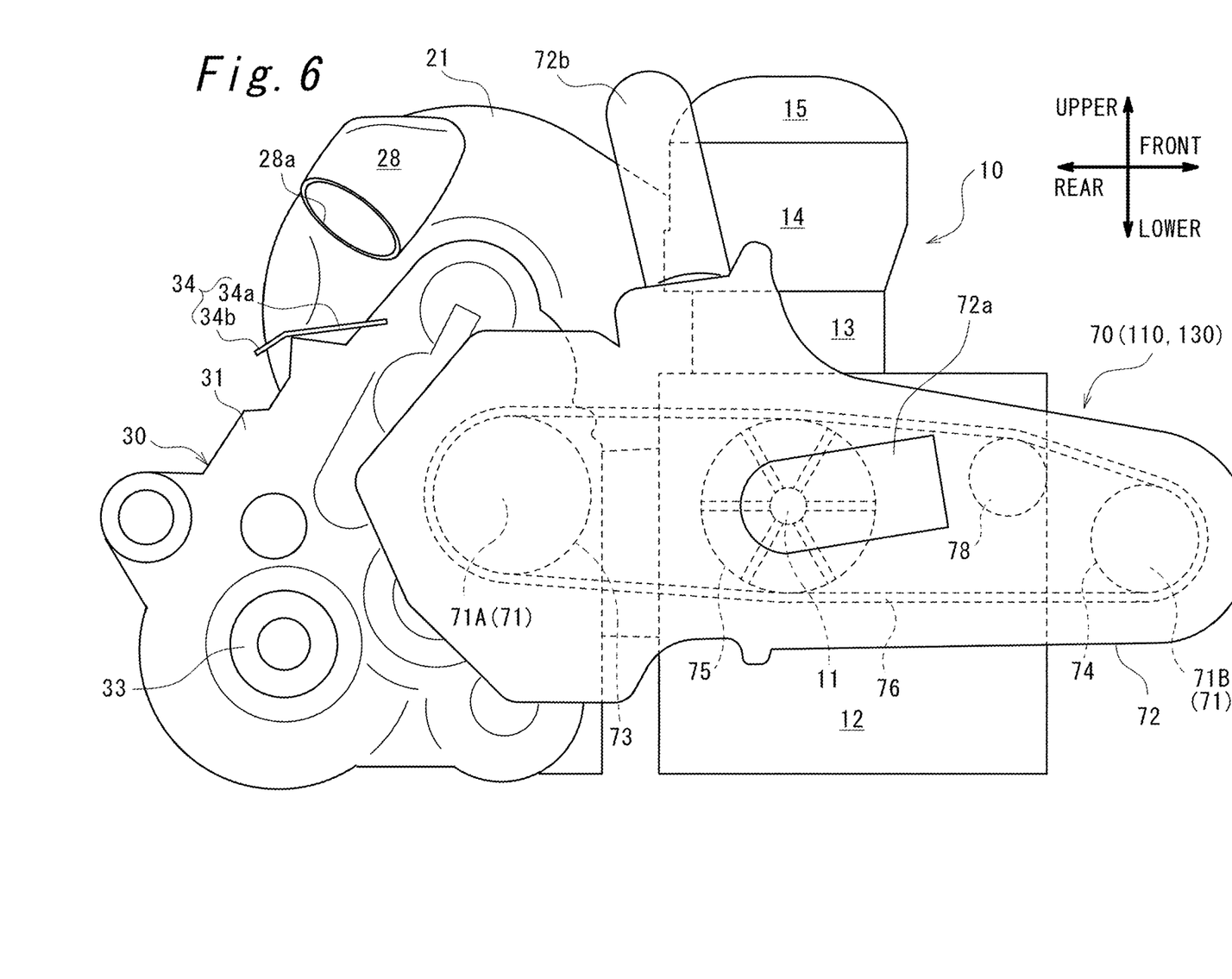
FIG. 6 is a right side view of the area around the engine body.

The CVT exhaust duct 28 projects from the CVT housing 21 in a direction to be closer to the engine body 10 in the vehicle width direction. Specifically, the CVT exhaust duct 28 curves and extends downward toward the inner side in the vehicle width direction, and opens in a direction inclined rearward and inward (right side) in the vehicle width direction toward the downward side above the transmission 30. As shown in FIG. 6, the CVT exhaust duct 28 is located below the upper end portion of the CVT housing 21.

As shown in FIGS. 1 and 2, the transmission 30 is located behind the engine body 10 and adjacent to the right side of the CVT 20. The transmission 30 includes a transmission housing 31 that constitutes an outer shell, and a transmission input shaft 32, a transmission output shaft 33, and a gear train (not shown) accommodated inside the transmission housing 31.

The transmission input shaft 32 extends in the vehicle width direction in an upper front portion of the transmission housing 31, and is connected to the CVT output shaft 23 so as to be able to transmit power. That is, the transmission input shaft 32 is located above and behind the crankshaft 11. The transmission output shaft 33 extends in the vehicle width direction in a lower rear portion of the transmission housing 31. That is, the transmission output shaft 33 is located below and behind the transmission input shaft 32. In the transmission 30, the drive rotation inputted from the CVT output shaft 23 is transmitted to the transmission input shaft 32, has the rotation speed changed through the gear train (not shown), and is outputted from the transmission output shaft 33.

Figure 3:
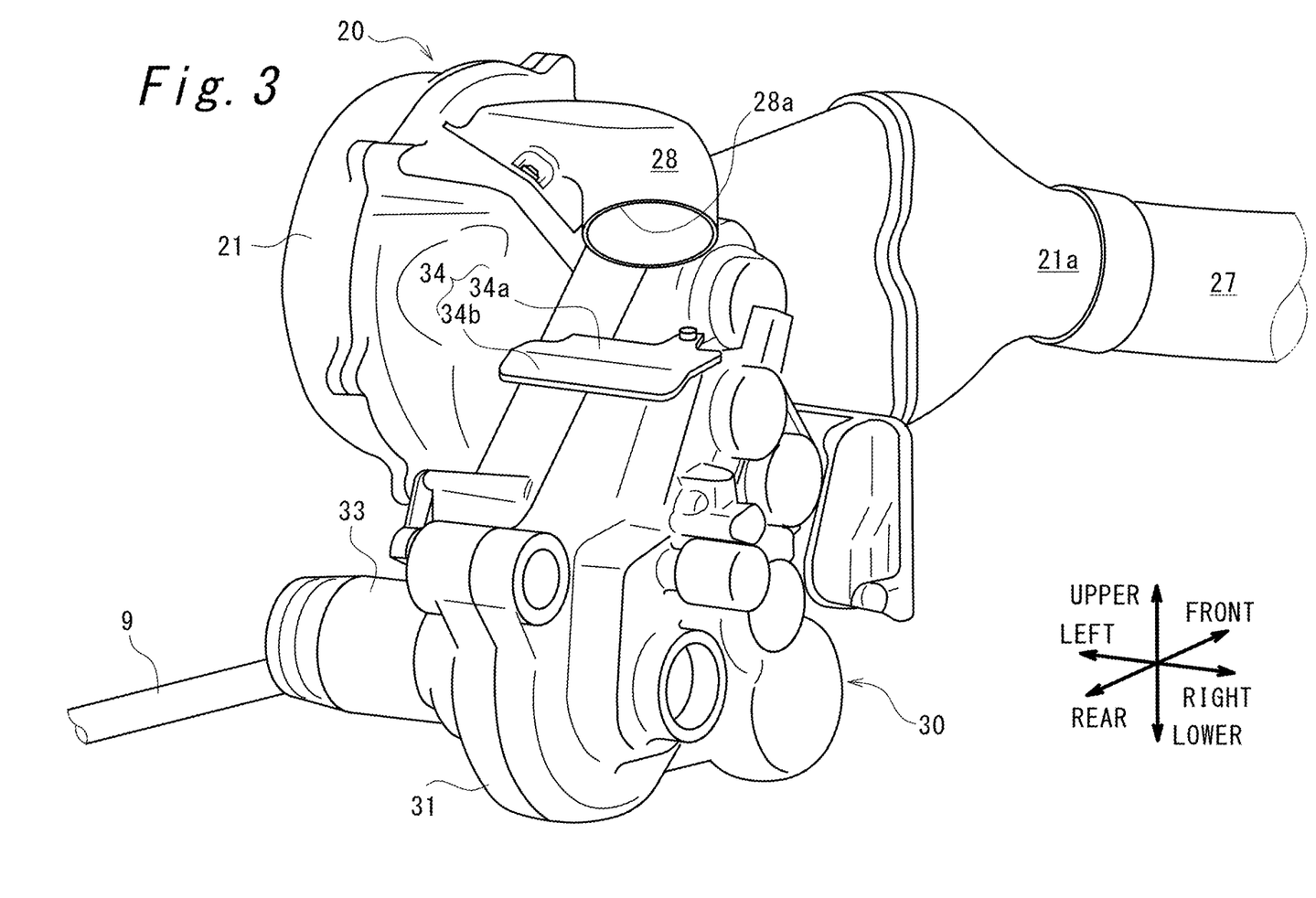
FIG. 3 is a perspective view of an area around a transmission as viewed from the rear.

FIG. 3 is a perspective view of an area around the transmission 30 as viewed from the rear and from the inner side in the vehicle width direction. As shown in FIG. 3, a drive shaft 9 for driving the rear wheel 4 is connected to the transmission output shaft 33. An upper portion of the transmission housing 31 is inclined downward toward the rear.

The transmission 30 further includes a baffle plate (wind guiding plate) 34. The baffle plate 34 is attached to the upper portion of the transmission housing 31. More specifically, the baffle plate 34 is disposed at a position below a discharge port 28a of the CVT exhaust duct 28 in the upper portion of the transmission housing 31, and is provided at a position at which the discharge port 28a of the CVT exhaust duct 28 faces the baffle plate 34 from above. The baffle plate 34 has a first surface portion 34a extending in the horizontal direction and a second surface portion 34b extending in a direction inclined downward toward the rear in a manner continuous with a rear edge of the first surface portion 34a.

The baffle plate 34 receives the air discharged from the CVT exhaust duct 28 on the first surface portion 34a and guides the air rearward via the second surface portion 34b.

As will be described later, the exhaust system 50 is located behind the baffle plate 34, and the exhaust system 50 is cooled by the air guided by the baffle plate 34.

With reference to FIGS. 1 and 2, the intake system 40 has an intake pipe 41, an air cleaner 42, and an engine intake duct 43. The intake pipe 41 has an intake manifold 44, a throttle body 45, and an air box 46 in this order from the downstream side of the intake path.

The intake manifold 44 has, on the downstream side, four independent port portions 44a connected to the intake ports 14a of the cylinder head 14 and a collecting port portion 44b in which the upstream sides of the independent port portion 44a are integrated into one. The independent port portion 44a extends in a direction inclined downward toward the rear. The collecting port portion 44b extends in the left-right direction in an upstream side end portion (front end in the diagram) of the independent port portions 44a. The collecting port portion 44b has an entrance in a left end portion.

The throttle body 45 is connected to the left side of the intake manifold 44. Specifically, the throttle body 45 is connected to a left end portion of the collecting port portion 44b of the intake manifold 44. In the present embodiment, the throttle body 45 adjusts the amount of air flowing into the engine body 10 as the opening degree of a butterfly valve (not shown) is electronically controlled, and thereby the rotation speed of the engine body 10 (crankshaft 11) is controlled.

The air box 46 is disposed below the front of the throttle body 45 and below a seat back 61 of the driver's seat 6A. The air box 46 is connected to an upstream side end portion (left side in the diagram) of the throttle body 45 with an air pipe 47 interposed between them. The air box 46 acts as a resonator that reduces intake noise in the intake system 40 or a surge tank that suppresses a sudden fluctuation in the amount of air flowing into the engine body 10.

The air cleaner 42 is connected to the air box 46 with an air pipe 48 interposed between them. The air cleaner 42 is disposed below the seat 6 on the front side of the engine body 10 with space between them. Specifically, the air cleaner 42 is disposed below a seat cushion 62 of the driver's seat 6A. More specifically, the air cleaner 42, in top view, has at least the left half overlapping the seat cushion 62 of the driver's seat 6A.

As shown in FIG. 1, in the vertical direction, an upper end portion of the air cleaner 42 is located below an upper end portion of the cylinder head 14. Specifically, the upper end portion of the air cleaner 42 is located at substantially the same height as a straight line W1 that passes through a lower end portion of the cylinder head 14 and extends horizontally in the front-rear direction. Further, as shown in FIG. 2, in the left-right direction, the air cleaner 42 has a left end portion located on the left side of the engine body 10 and further on the right side than a left end portion of the CVT 20, and a right end portion located further on the right side than a left end portion of the engine body.

With reference to FIG. 1 as well, a downstream side end portion of the engine intake duct 43 is connected to the lower rear end of the left side surface of the air cleaner 42. The engine intake duct 43 extends below the seat 6 to the right, curves forward below the substantial center in the vehicle width direction of the seat 6, and extends forward below the CVT intake duct 27 to reach the bonnet space Z. The front opening tip of the engine intake duct 43 extends upward and opens forward on the right side of the front opening tip of the CVT intake duct 27 in the bonnet space Z. However, the positional relationship between the opening tips is not limited to one in the present embodiment.

In the intake system 40, the intake air taken in through the engine intake duct 43 is filtered by the air cleaner 42 and then reaches the throttle body 45 via the air box 46. In the throttle body 45, the intake air is adjusted to the air flow rate according to the output required by the engine body 10 and reaches the intake manifold 44. In the intake manifold 44, the intake air is distributed from the collecting port portion 44b to the independent port portions 44a and introduced into the intake ports 14a.

Figure 4:
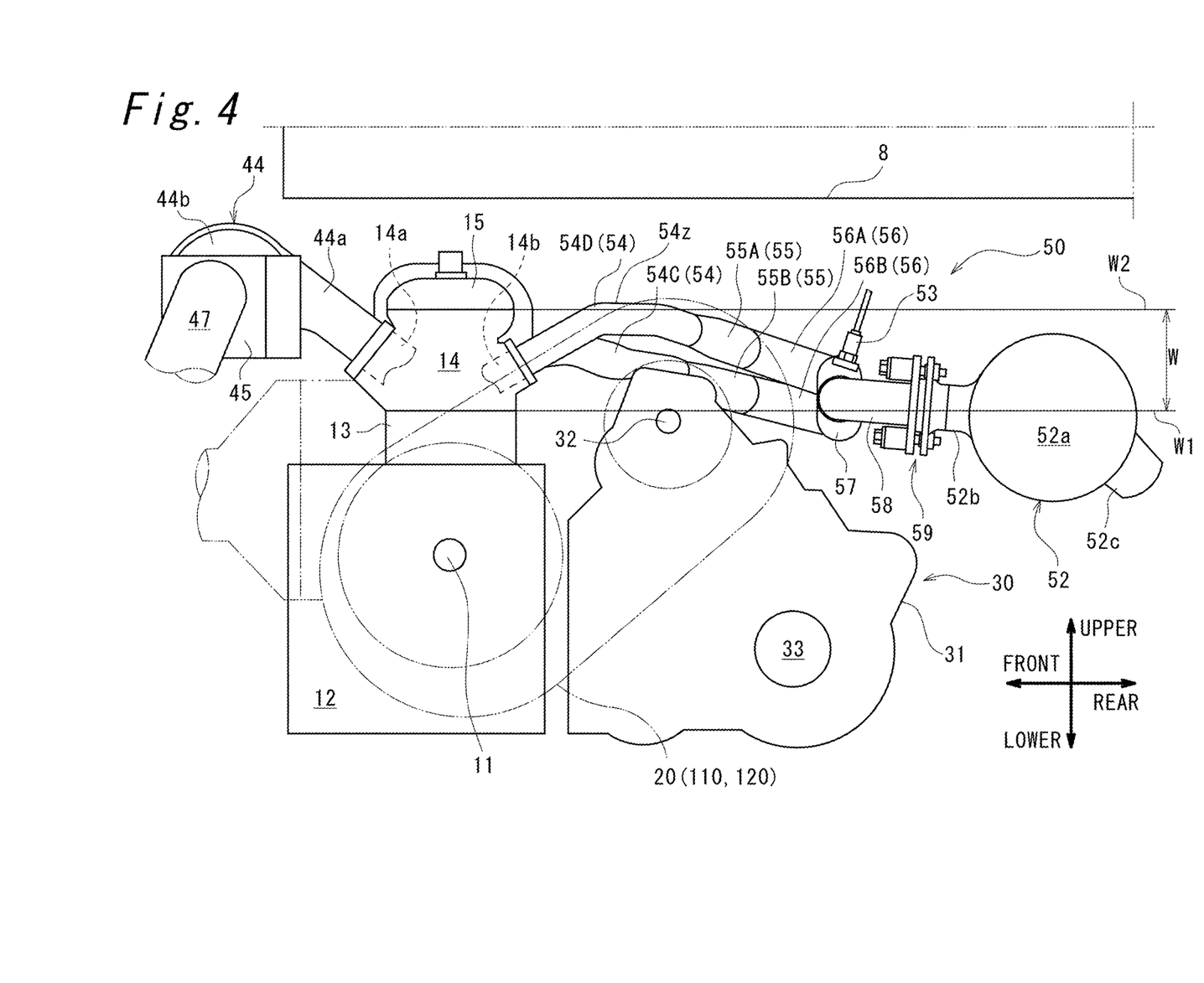
FIG. 4 is an enlarged view of the area around an engine body in FIG. 1.
Figure 5:
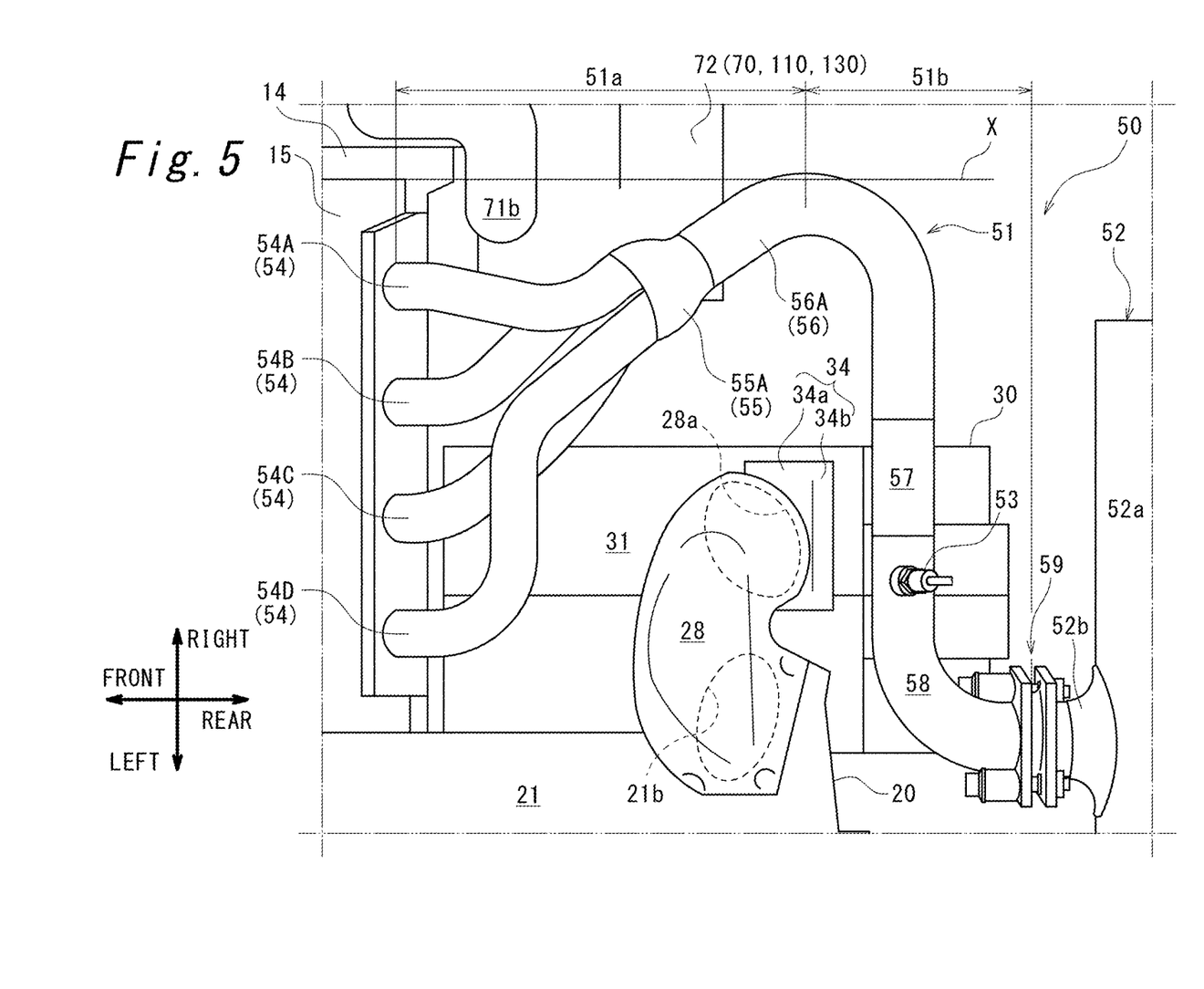
FIG. 5 is an enlarged view of the area around an exhaust pipe in FIG. 2.

FIG. 4 is a right side view illustrating an area around the exhaust system 50 in the powertrain mechanism 7. Note that, in FIG. 4, the CVT 20 is shown by a chain double-dashed line. FIG. 5 is a top view illustrating an area around an exhaust pipe 51 in an enlarged manner in the powertrain mechanism 7. As shown in FIGS. 4 and 5, the exhaust system 50 includes the exhaust pipe 51, an exhaust muffler 52, and an exhaust gas sensor 53. The exhaust pipe 51 has four independent exhaust pipes 54, two first collecting pipes 55, two first exhaust pipes 56, one second collecting pipe 57, and one second exhaust pipe 58 in this order from the upstream side.

The four independent exhaust pipes 54 are connected to the four exhaust ports 14b of the cylinder head 14. The four independent exhaust pipes 54 are composed of a first independent exhaust pipe 54A, a second independent exhaust pipe 54B, a third independent exhaust pipe 54C, and a fourth independent exhaust pipe 54D disposed in this order from the right side. The fourth independent exhaust pipe 54D is connected to the exhaust port 14b (CVT side exhaust port) located on the side closest to the CVT among the four exhaust ports 14b, and constitutes the CVT side exhaust pipe of the present invention.

The first independent exhaust pipe 54A and the fourth independent exhaust pipe 54D extend in a direction inclined upward toward the rear, and have a top portion 54z in a substantially central portion in the front-rear direction. The two first collecting pipes 55 are composed of an upper first collecting pipe 55A located on the upper side and a lower first collecting pipe 55B located on the lower side.

The first collecting pipe 55 is located in a manner corresponding to the rear side of a right end portion of the engine body 10, and has an upstream side end portion opening in a direction inclined to the left toward the front.

The first independent exhaust pipe 54A extends rearward from the exhaust port 14b, curves to the left and then curves to the right, and is connected to an upstream side end portion of the first collecting pipe 55. The second to fourth independent exhaust pipes 54B to 54D curve to the right from the exhaust port 14b toward the rear to reach the first collecting pipe 55. In particular, the fourth independent exhaust pipe 54D curves approximately at right angles to the opposite side to the CVT, that is, to the right, immediately after extending rearward from an end portion connected to the exhaust port 14b.

The first independent exhaust pipe 54A and the fourth independent exhaust pipe 54D are connected to an upstream side end portion of the upper first collecting pipe 55A. The second independent exhaust pipe 54B and the third independent exhaust pipe 54C are connected to an upstream side end portion of the lower first collecting pipe 55B. The second and third independent exhaust pipes 54B, 54C and the lower first collecting pipe 55B are adjacent to the right side of an upper end portion of the transmission 30.

The two first exhaust pipes 56 are composed of an upper first exhaust pipe 56A connected to a downstream side end portion of the upper first collecting pipe 55A and a lower first exhaust pipe 56B connected to a downstream side end portion of the lower first collecting pipe 55B, and are connected to an upstream side end portion of the second collecting pipe 57, respectively. Each of the two first exhaust pipes 56 extends from a downstream side end portion of the corresponding first collecting pipe 55 in a direction inclined to the right toward the rear, then curves to the left and extends to the left substantially parallel to the vehicle width direction, and is connected to an upstream side end portion of the second collecting pipe 57.

The second collecting pipe 57 is located in the direction in which the discharge port of the CVT exhaust duct 28 is directed in the top view illustrated in FIG. 5. As a result, the air discharged from the CVT exhaust duct 28 is guided by the baffle plate 34 and supplied to the second collecting pipe 57. Therefore, although the temperature of the second collecting pipe 57 tends to rise due to the gathering of the two first exhaust pipes 56, the temperature rise is effectively suppressed by the air discharged from the CVT 20. In this manner, heat transfer of temperature from the exhaust system 50 to the cargo bed 8 is suppressed.

The second exhaust pipe 58 is connected to a downstream side end portion of the second collecting pipe 57. The second exhaust pipe 58 extends to the left side substantially parallel to the vehicle width direction from a downstream side end portion of the second collecting pipe 57, then curves rearward behind a left end portion of the engine body 10, and is connected to an upstream side end portion (a muffler inlet portion 52b) of the exhaust muffler 52 with a spherical joint 59 interposed between them. The exhaust gas sensor 53 is attached to an upstream side portion of the second exhaust pipe 58.

As described above, the exhaust pipe 51 curves to the right toward the rear, then extends to the rear of a right end portion of the engine body 10, curves to the left, and extends to the rear of a left end portion of the engine body 10. As a whole, the exhaust pipe 51 extends in a substantially S-shape. Of the exhaust pipe 51, a portion located on the upstream side and extending to the right toward the rear constitutes an upstream side exhaust pipe 51a (also referred to as the front half portion) of the present invention, and a portion connected to a rear end portion of the upstream side exhaust pipe 51a and extending to the left side toward the rear constitutes a downstream side exhaust pipe 51b (also referred to as the rear half portion) of the present invention.

That is, in the present embodiment, the upstream side exhaust pipe 51a includes a portion that extends in the direction inclined to the right side toward the rear and is located on the far right of the two first exhaust pipes 56, in addition to the four independent exhaust pipes 54 and the two first collecting pipes 55. Further, the downstream side exhaust pipe 51b includes a portion extending substantially parallel to the vehicle width direction by curving to the left toward the rear in a manner continuous with a downstream side end portion of the upstream side exhaust pipe 51a of the two first exhaust pipes 56, the second collecting pipe 57, and the second exhaust pipe 58.

The upstream side exhaust pipe 51a has, in the top view, a portion that passes through a region that is further on the right than a straight line X (see FIG. 5) extending in the front-rear direction through a right end portion of the cylinder head cover 15, and is located further on the left than a right end portion of an auxiliary case 72 (the engine auxiliary unit 70, the power transmission unit 110, and the auxiliary transmission unit 130) described later.

The exhaust muffler 52 has a cylindrical muffler main body 52a extending in the vehicle width direction, the muffler inlet portion 52b protruding forward at a left end portion, and a tail pipe 52c protruding rightward from a right end portion and curves rearward. The muffler inlet portion 52b constitutes a connection portion connected to a downstream side end portion of the exhaust pipe 51. In other words, in the exhaust system 50, the exhaust pipe 51 and the exhaust muffler 52 are disposed so as to be side by side in the front-rear direction, do not overlap in the vertical direction, and are different in position in the front-rear direction.

Here, referring to FIG. 4, the exhaust system 50 is disposed at substantially the same height as the cylinder head 14 in the vertical direction. Specifically, the exhaust pipe 51 is generally located in a region W where the cylinder head 14 is projected rearward. The region W is defined as a region in the vertical direction between the straight line W1 that passes through a lower end portion of the cylinder head 14 and extends to the rear and a straight line W2 that passes through an upper end portion of the cylinder head 14 and extends to the rear. In the vertical direction, the top portion 54z that is highest of the exhaust pipe 51 is located at substantially the same height as the straight line W1. Further, an upper end portion of the exhaust muffler 52 is located at substantially the same height as the straight line W1 in the vertical direction.

As shown in FIG. 2, in the left-right direction, the engine auxiliary unit 70 (the power transmission unit 110 and the auxiliary transmission unit 130) is disposed adjacent to the side opposite to the CVT 20 of the engine body 10, that is, on the right side. FIG. 6 is a right side view illustrating an area around the engine body 10. As shown in FIG. 6, the engine auxiliary unit 70 has an engine auxiliary 71 and an auxiliary case 72 that accommodates the engine auxiliary 71. The auxiliary case 72 covers the engine auxiliary 71 accommodated inside from the outer side in the vehicle width direction, which prevents a foreign matter such as water or sand from directly splashing on the engine auxiliary 71.

The engine auxiliary 71 includes an alternator 71A disposed behind the engine body 10 and an air conditioner compressor 71B disposed in front of the engine body 10. The alternator 71A and the air conditioner compressor 71B have driven pulleys 73 and 74 in a right end portion. Further, inside the auxiliary case 72, a drive pulley 75 fixed to a right end portion of the crankshaft 11, a belt 76 wound over between the drive pulley 75 and the driven pulleys 73 and 74, and a tensioner 78 that adjusts the tension of the belt 76 are disposed.

Therefore, the alternator 71A and the air conditioner compressor 71B are rotationally driven as the crankshaft 11 rotates.

The auxiliary case 72 has an auxiliary case intake pipe 72a and an auxiliary case exhaust pipe 72b. The auxiliary case intake pipe 72a extends forward from a position facing a right end portion of the crankshaft 11 and opens forward. For example, the drive pulley 75 may be provided with a fin to constitute a centrifugal fan, and, as the drive pulley 75 rotates, air may be taken in from the auxiliary case intake pipe 72a to the inside of the auxiliary case 72.

The auxiliary case exhaust pipe 72b extends from an upper portion of the auxiliary case 72 in a direction inclined rearward and opens to the rear of the engine body 10. Specifically, the auxiliary case exhaust pipe 72b opens from the right side toward the independent exhaust pipe 54 of the exhaust system 50. The independent exhaust pipe 54 is effectively cooled by the air discharged from the auxiliary case exhaust pipe 72b. This also suppresses the heat transfer of temperature from the exhaust system 50 to the cargo bed 8.

Here, in the powertrain mechanism 7 according to the present embodiment, at least a part of each of the transmission 30, the air cleaner 42, the exhaust pipe 51, and the exhaust muffler 52 is disposed within a region Y (see FIGS. 1 and 2) in which the engine body 10 is projected in the front-rear direction.

As shown in FIG. 1, the region Y has an upper end portion constituted by a horizontal plane Y1 passing through an upper end portion of the cylinder head cover 15, and has a lower end portion constituted by a horizontal plane Y2 passing through a lower end portion of the crankcase 12. Further, as shown in FIG. 2, the region Y has a left end portion constituted by an extending surface Y3 that passes through a left end portion of the engine body 10 and extends in the front-rear direction, and a right end portion constituted by a vertical plane Y4 that passes through a right end portion of the engine body 10 and extends in the front-rear direction. Note that, in a case where an additional part such as an oil pan is mounted on a lower end portion of the crankcase 12, the horizontal plane Y2 is defined by a horizontal plane passing through a lower end portion of the additional part.

According to the vehicle 100 according to the embodiment described above, an effect described below is achieved.

(1) Since at least a part of the transmission 30, the intake pipe 41, the air cleaner 42, the exhaust pipe 51, and the exhaust muffler 52 is located in the region Y where the engine body 10 is projected in the front-rear direction, the powertrain mechanism 7 of the vehicle is compactly disposed in the vehicle width direction and the vertical direction. In this manner, the vehicle 100 is compactly configured in the vehicle width direction and the vertical direction.

(2) Since the seat 6 is located further to the front than the engine body 10, the transfer of heat generated from the engine body 10 to the seat 6 is suppressed. In this manner, the discomfort for a person seated in the seat 6 caused by the heat from the engine body 10 is suppressed.

(3) Since the vehicle 100 is a utility vehicle, the above effect of the invention is preferably exhibited. That is, it is easy to make the height of the cargo bed low while making the dimensions of the utility vehicle in the vehicle width direction compact.

(4) Since the exhaust port 14b is provided in a rear portion of the cylinder head 14, when the exhaust system related parts (for example, the exhaust muffler 52), which have a relatively high temperature, are disposed away from the seat 6 so as to suppress heat transfer to the seat 6 side, space occupied by a pipe (for example, the exhaust pipe 51) connecting these parts and the cylinder head 14 can be reduced. In this manner, it is easy to compactly configure the powertrain mechanism 7 in the vertical direction and the left-right direction while suppressing the discomfort for an occupant.

(5) Since the air cleaner 42 is disposed under the seat 6, the air cleaner 42 can be disposed by utilizing the dead space under the seat 6, and the intake pipe 41 that connects the cylinder head 14 and the air cleaner 42 disposed on the front side of the cylinder head 14 can be configured to be short.

(6) Since the positions of the exhaust pipe 51 and the exhaust muffler 52 are different in the front-rear direction, the exhaust muffler 52 can be easily disposed further above as compared with the case where the exhaust pipe 51 and the exhaust muffler 52 are disposed overlapping in the vertical direction. In this manner, it is easy to suppress the intrusion of water into the engine body 10 through the tail pipe 52c of the exhaust muffler 52, and it is easy to suppress the contact of water to the exhaust pipe 51, which affects the engine performance by being cooled. Accordingly, it is easy to improve wading performance.

(7) Since the top portion 54z of the exhaust pipe 51 is located at almost the same height as the horizontal plane W2 passing through an upper end portion of the cylinder head 14 in the vertical direction, it is easy to suppress the contact of the exhaust pipe 51 with water more while the powertrain mechanism 7 is compactly configured in the vertical direction.

(8) Since an upper end portion of the exhaust muffler 52 is located at substantially the same height as the horizontal plane W2 passing through an upper end portion of the cylinder head 14 in the vertical direction, it is easy to dispose the exhaust muffler 52 further above. In this manner, it is further easier to suppress water intrusion into the exhaust muffler 52 while keeping the powertrain mechanism 7 compact in the vertical direction.

(9) Since a front end upper portion of the transmission 30 is adjacent to the left side of the upstream side exhaust pipe 51a (front half portion) of the exhaust pipe 51, the transmission 30 can be easily configured to be long in the vertical direction while interference with the exhaust pipe 51 is prevented. In this manner, the transmission 30 can be compactly configured in the front-rear direction.

(10) Since the fourth independent exhaust pipe 54D (that is, the CVT side exhaust pipe) curves to the opposite side (right side) to the CVT 20 immediately after the exhaust port 14b, it is easy to configure the exhaust pipe 51 in a manner that interference with the transmission 30 is suppressed. Further, as compared with the case where the exhaust pipe 51 is curved toward the CVT 20 side, it is easy to lengthen the exhaust pipe 51 and improve the engine performance.

(11) Since an upper portion of the transmission 30 is inclined downward toward the rear, it is easier to further configure the exhaust pipe 51 so as to suppress interference with the transmission 30.

(12) Since the CVT exhaust duct 28 is located above the transmission 30 and below an upper end portion of the CVT housing 21, it is easy to compactly arrange the CVT exhaust duct 28 above the transmission 30. In this manner, rising of the height position of the cargo bed 8 is suppressed while the CVT exhaust duct 28 is provided.

(13) Since the engine auxiliary 71 is covered from the vehicle width direction by the auxiliary case 72, the engine auxiliary 71 can be protected from a foreign matter such as water and sand. In particular, the effect of the present invention is preferably exhibited in a case where the vehicle travels on a submerged road, an uneven terrain road, and the like.

(14) Since the auxiliary case 72 is provided with the auxiliary case intake pipe 72a and the auxiliary case exhaust pipe 72b, the engine auxiliary 71 accommodated in the auxiliary case 72 is effectively cooled.

(15) Since the air cleaner 42 is disposed so as to have the upper end located below the horizontal plane W2 passing through an upper end portion of the cylinder head 14, an increase in the dimension in the vertical direction of the powertrain mechanism 7 can be suppressed and the powertrain mechanism 7 can be easily accommodated in a limited space.

(16) Since the air cleaner 42 is disposed on the front side of the engine body 10 so as to extend over from the engine body 10 to the CVT 20 (the power transmission unit 110 and the driving force transmission unit 120) in the vehicle width direction, it is easy to increase the capacity of the air cleaner 42. Further, since the air cleaner 42 is located on the inner side (further right) in the vehicle width direction than a left end portion of the CVT 20, it is easy to compactly configure the powertrain mechanism 7 as a whole in the vehicle width direction. Therefore, it is easy to secure the mountability of the powertrain mechanism 7 on the vehicle 100 while configuring the air cleaner 42 to be large in the vehicle width direction.

(17) The air cleaner 42 is disposed on the front side with respect to the engine body 10 with space between them, and is disposed directly under the driver's seat 6A. In this manner, it is easy to suppress heat transfer from the engine body 10 to the air cleaner 42. Further, it is easy to access the air cleaner 42 from seat 6 and maintainability is excellent. Further, since the air cleaner 42 is disposed directly under the driver's seat 6A, the space below the passenger seat 6B can be configured as, for example, a storage space.

(18) Since the exhaust pipe 51 passes through a region on the outer side (further right) in the vehicle width direction than the cylinder head cover 15, it is easy to lengthen the exhaust pipe 51. Further, since the exhaust pipe 51 extends inward (further left) in the vehicle width direction than an outer end portion (right end portion) in the vehicle width direction of the auxiliary transmission unit 130 (the auxiliary case 72, the engine auxiliary unit 70, and the drive transmission unit 110), it is easy to compactly configure the powertrain mechanism 7 as a whole in the vehicle width direction. That is, deterioration in the mountability of the powertrain mechanism 7 on the vehicle 100 can be suppressed while the exhaust length is lengthened.

(19) The exhaust muffler 52 is connected to a downstream portion of the exhaust pipe 51, and the exhaust muffler 52 has the muffler inlet portion 52b (connection portion) connected to the exhaust pipe 51 on the front surface and in a left end portion. In this manner, the exhaust pipe 51 can be extended in an S-shape, and the length of the exhaust pipe can be easily increased. Further, the exhaust muffler 52 and the exhaust pipe 51 can be easily disposed in the front-rear direction, and the exhaust muffler 52 can be easily disposed so that the upper end is located above the lower end of the exhaust pipe 51. Furthermore, since the exhaust muffler 52 can be disposed behind the exhaust pipe 51, the influence of the temperature due to the exhaust muffler 52 with respect to the engine body 10 and other units is suppressed.

In the above embodiment, the case where the air box 46 is interposed between the throttle body 45 and the air cleaner 42 is described as an example. However, the air box 46 is not necessarily needed. That is, the throttle body 45 and the air cleaner 42 may be configured to be directly connected by an air pipe.

Further, in the above embodiment, the case where the exhaust pipe 51 and the exhaust muffler 52 are directly connected is described as an example. However, another exhaust pipe may be interposed between the exhaust pipe 51 and the exhaust muffler 52, so that the exhaust pipe 51 and the exhaust muffler 52 are configured to be indirectly connected.

What is claimed is:
1. A vehicle, comprising:
an engine body that has a crankcase that rotatably supports a crankshaft, a cylinder, and a cylinder head provided with an intake port and an exhaust port in this order from bottom, in which a central axis of the crankshaft extends in a vehicle width direction;
a CVT disposed on a side portion in the vehicle width direction of the engine body, the CVT having a CVT input shaft connected to the crankshaft so as to be able to transmit power and a CVT output shaft that outputs drive rotation which is inputted to the CVT input shaft and then changed in rotation speed;

a transmission disposed on one side in a front-rear direction of the engine body, the transmission having a transmission input shaft connected to the CVT output shaft so as to be able to transmit power and a transmission output shaft that outputs drive rotation which is inputted to the transmission input shaft and then changed in rotation speed;

an intake pipe connected to the intake port of the cylinder head;

an air cleaner directly or indirectly connected to an upstream side of the intake pipe;

an exhaust pipe connected to the exhaust port of the cylinder head; and an exhaust muffler directly or indirectly connected to a downstream side of the exhaust pipe, wherein at least a part of each of the transmission, the intake pipe, the air cleaner, the exhaust pipe, and the exhaust muffler is disposed in a region where the engine body is projected in a front-rear direction.

2. The vehicle according to claim 1, wherein
the vehicle is a utility vehicle,
the utility vehicle has a seat, and
the seat is located further on front than the engine body.

3. The vehicle according to claim 2, wherein
the utility vehicle further has a cargo bed located behind the seat, and
the engine body, the CVT, the transmission, the intake pipe, the exhaust pipe, and the exhaust muffler are located under the cargo bed.

4. The vehicle according to claim 2, wherein
the cylinder head has the intake port in a front portion and the exhaust port in a rear portion.

5. The vehicle according to claim 4, wherein
the air cleaner is disposed below the seat.

6. The vehicle according to claim 2, wherein
positions of the exhaust pipe and the exhaust muffler in a front-rear direction are different.

7. The vehicle according to claim 2, wherein
a position of an upper end portion of the exhaust pipe in a vertical direction is almost same as an upper end portion of the cylinder head.

8. The vehicle according to claim 2, wherein
a position of an upper end portion of the exhaust muffler in a vertical direction is almost same as an upper end portion of the cylinder head.

9. The vehicle according to claim 4, wherein
the transmission input shaft is located above and behind the crankshaft,
the transmission output shaft is located below and behind the transmission input shaft, and
a front end upper portion of the transmission is adjacent to a front half portion of the exhaust pipe in a vehicle width direction.

10. The vehicle according to claim 9, wherein
the exhaust port is one of a plurality of exhaust ports formed in the cylinder head,
the exhaust pipe has a CVT side exhaust pipe connected to a CVT side exhaust port located on a side closest to the CVT in a vehicle width direction among a plurality of the exhaust ports, and
in top view, the CVT side exhaust pipe curves to a side opposite to the CVT in the vehicle width direction immediately after the CVT side exhaust port.

11. The vehicle according to claim 10, wherein
an upper portion of the transmission is inclined downward toward rear.

12. The vehicle according to claim 4, wherein
the CVT has
a drive pulley,
a driven pulley,
an endless belt wound over between the drive pulley and the driven pulley,
a CVT housing that accommodates the drive pulley, the driven pulley, and the endless belt, and
an exhaust duct that protrudes in a direction toward the engine body in a vehicle width direction from the CVT housing and discharges gas to rear, and
the exhaust duct is located above the transmission and below an upper end portion of the CVT housing.

13. The vehicle according to claim 2, wherein
the crankcase is provided, on a side portion opposite to a side where the CVT is located in a vehicle width direction, with an engine auxiliary that is rotationally driven by the crankshaft is attached, and
the engine auxiliary is covered from an outer side in a vehicle width direction by an auxiliary case.

14. The vehicle according to claim 13, wherein
the auxiliary case is formed with
an intake opening through which air is introduced into the auxiliary case, and
an exhaust opening through which air is discharged from the auxiliary case.

15. A vehicle comprising:
an engine body which has a crankshaft extending in a vehicle width direction and a cylinder head;
an intake pipe disposed on a front side of the engine body;
an exhaust pipe disposed on a rear side of the engine body; and
an air cleaner located on a front side of the engine body and directly or indirectly connected to an upstream side of the intake pipe, wherein
an upper end of the air cleaner is located below an upper end of the cylinder head.

16. The vehicle according to claim 15, further comprising a power transmission unit that is disposed on one side in a vehicle width direction of the engine body and to which power is transmitted from the engine body, wherein
in the air cleaner,
an end portion on the one side in the vehicle width direction is disposed in a region that is located on an outer side in the vehicle width direction than the engine body and located on an inner side in the vehicle width direction than an outer end portion in the vehicle width direction of the power transmission unit, and
an end portion on other side in the vehicle width direction is located on an inner side in the vehicle width direction than an end portion in the vehicle width direction of the engine body.

17. The vehicle according to claim 15, wherein
the air cleaner is disposed on a front side with respect to the engine body with space therebetween, and
the air cleaner is disposed directly under a driver's seat.

18. The vehicle according to claim 15, further comprising a power transmission unit that is disposed on one side in a vehicle width direction of the engine body and to which power is transmitted from the engine body, wherein
the power transmission unit includes
a driving force transmission unit that is disposed on one side in the vehicle width direction of the engine body and to which power is transmitted from the engine body as a driving force for traveling, and an auxiliary transmission unit that is disposed on other side in the vehicle width direction of the engine body and to which power is transmitted from the engine body as a driving force for an auxiliary attached to the engine body, the cylinder head is provided with an exhaust port on a rear side, a cylinder head cover is fixed to an upper portion of the cylinder head, the exhaust pipe includes an upstream side exhaust pipe that curves toward the other side in the vehicle width direction as the upstream side exhaust pipe extends from the exhaust port to rear, and a downstream side exhaust pipe that is connected to a rear end portion of the upstream side exhaust pipe and extends to the one side in the vehicle width direction, and at least a part of the upstream side exhaust pipe passes through a region that is located on an outer side in the vehicle width direction than the cylinder head cover and located on an inner side in the vehicle width direction than an outer end portion in the vehicle width direction of the auxiliary transmission unit.

19. The vehicle according to claim 18, further comprising an exhaust muffler connected to a downstream portion of the exhaust pipe, wherein the exhaust muffler is provided with a connection portion connected to the exhaust pipe in an end portion on a front surface and on the one side in the vehicle width direction.

20. A vehicle comprising:

an engine body which has a crankshaft extending in a vehicle width direction and a cylinder head;

an intake pipe disposed on a front side of the engine body;

an exhaust pipe disposed on a rear side of the engine body; and a power transmission unit that is disposed on an outer side in the vehicle width direction of the engine body and to which power is transmitted from the engine body, wherein the power transmission unit includes a driving force transmission unit that is disposed on one side in the vehicle width direction of the engine body and to which power is transmitted from the engine body as a driving force for traveling, and an auxiliary transmission unit that is disposed on other side in the vehicle width direction of the engine body and to which power is transmitted from the engine body as a driving force for an auxiliary attached to the engine body, the cylinder head is provided with an exhaust port on a rear side, a cylinder head cover is fixed to an upper portion of the cylinder head, the exhaust pipe includes an upstream side exhaust pipe that curves toward the other side in the vehicle width direction as the upstream side exhaust pipe extends from the exhaust port to rear, and a downstream side exhaust pipe that is connected to a rear end portion of the upstream side exhaust pipe and extends to the one side in the vehicle width direction, and at least a part of the upstream side exhaust pipe passes through a region that is located on an outer side in the vehicle width direction than the cylinder head cover and located on an inner side in the vehicle width direction than an outer end portion in the vehicle width direction of the auxiliary transmission unit.

\* \* \* \* \*